United States Patent
Choi

(10) Patent No.: US 9,753,236 B1
(45) Date of Patent: Sep. 5, 2017

(54) OPTICAL TRANSCEIVER FOR BI-DIRECTIONAL OPTICAL COMMUNICATION AND METHOD OF MANUFACTURING THE SAME

(71) Applicant: FIBERPIA CO., LTD., Daejeon (KR)

(72) Inventor: Young Bok Choi, Daejeon (KR)

(73) Assignee: FIBERPIA CO., LTD., Daejeon (KR)

( * ) Notice: Subject to any disclaimer, the term of this patent is extended or adjusted under 35 U.S.C. 154(b) by 0 days.

(21) Appl. No.: 15/349,344

(22) Filed: Nov. 11, 2016

(30) Foreign Application Priority Data

Jul. 19, 2016 (KR) .................. 10-2016-0091501

(51) Int. Cl.
| | |
|---|---|
| *G02B 6/42* | (2006.01) |
| *H04J 14/02* | (2006.01) |
| *G02B 6/32* | (2006.01) |
| *G02B 6/293* | (2006.01) |

(52) U.S. Cl.
CPC ......... *G02B 6/4246* (2013.01); *G02B 6/2938* (2013.01); *G02B 6/32* (2013.01); *G02B 6/424* (2013.01); *G02B 6/4214* (2013.01); *G02B 6/4215* (2013.01); *G02B 6/4292* (2013.01); *G02B 6/4295* (2013.01); *H04J 14/0227* (2013.01); *G02B 6/29364* (2013.01); *H04Q 2213/1327* (2013.01)

(58) Field of Classification Search
None
See application file for complete search history.

(56) References Cited

U.S. PATENT DOCUMENTS

| | | | | | |
|---|---|---|---|---|---|
| 4,880,289 | A | * | 11/1989 | Imoto ................. | G02B 6/2937 385/24 |
| 5,031,984 | A | * | 7/1991 | Eide .................... | G02B 6/2804 385/15 |
| 5,859,940 | A | * | 1/1999 | Takahashi ........... | G02B 6/2817 385/31 |
| 6,735,361 | B2 | * | 5/2004 | Gilliland ............. | G02B 6/3869 385/37 |
| 6,804,431 | B2 | * | 10/2004 | Kowalkowski ...... | G02B 6/4292 385/147 |

(Continued)

FOREIGN PATENT DOCUMENTS

WO   WO 2008/006402 A1 * 1/2008

*Primary Examiner* — Mike Stahl
(74) *Attorney, Agent, or Firm* — Antonio Ha & U.S. Patent, LLC

(57) ABSTRACT

An optical transceiver including an optical transmitter and an optical receiver for performing a bi-directional communication over a single optical transmission fiber is provided. The optical transmitter includes a laser diode, a main body in which a receptacle part corresponding to an optical connector is formed, the optical connector to which a first optical fiber is coupled using a first supporting member, a second supporting member for supporting a portion coupled between the receptacle part and the optical connector, a plane-spring part provided in at least one of the main body and the optical connector. The optical connector has been coupled to the receptacle part. The plane-spring part is configured to provide an elasticity in a first direction to prevent an additional coupling toward the main body, the first direction is opposite toward the main body. The first optical fiber is connected to the optical receiver.

7 Claims, 3 Drawing Sheets

(56) References Cited

U.S. PATENT DOCUMENTS

| | | | |
|---|---|---|---|
| 8,655,183 B2* | 2/2014 | Ho | H04J 14/0246 398/135 |
| 2009/0226171 A1* | 9/2009 | Liu | G02B 6/4246 398/82 |
| 2014/0161394 A1* | 6/2014 | Ho | G02B 6/4293 385/78 |
| 2014/0248057 A1* | 9/2014 | Li | G02B 6/29365 398/82 |
| 2015/0104177 A1* | 4/2015 | Kato | H04B 10/40 398/79 |

* cited by examiner

OPTICAL TRANSCEIVER FOR BI-DIRECTIONAL OPTICAL COMMUNICATION AND METHOD OF MANUFACTURING THE SAME

CROSS-REFERENCE TO RELATED APPLICATION

This application claims priority under 35 U.S.C. §119 from Korean Patent Application No. 10-2016-0091501, filed on Jul. 19, 2016, in the Korean Intellectual Property Office (KIPO), the disclosure of which is incorporated by reference herein in its entirety.

TECHNICAL FIELD

The present invention relates to an optical transmission system or an optical transceiver module for a bi-directional communication, and more particularly to, an optical transceiver for a wavelength-division multiplexing (WDM) bi-directional communication where transmission and receipt of optical signals are conducted over an optical fiber channel and a method for manufacturing the optical transceiver.

DISCUSSION OF THE RELATED ART

Since a wavelength division multiplexing (WDM) amid various multiplexing techniques facilitates data transmissions by dividing wavelength channels without further installing optical cables, it allows to an easy channel expansion and is suitable for high-capacity communication network.

A WDM-based optical transmission system may include a downlink channel from a central office to a base station, an uplink channel from the base station to the central office, and various WDM devices at each of transmitting and receiving ends for performing multiplexing and de-multiplexing of signals, and thus facilitating more efficient optical wavelength channel usages.

FIG. 1 depicts a configuration of an example existing WDM optical transmission system. As depicted, the existing WDM optical transmission system includes a first station 1 and a second station 2. The first station 1 includes a laser diode (LD) assembly 11 including a plurality of laser diodes and a multiplexer 10 for multiplexing optical signals generated from the laser diodes. The first station 1 further includes a photo-diode (PD) assembly 17 including a plurality of photo-diodes and a de-multiplexer 10 for de-multiplexing optical signals transmitted over an optical fiber channel C2 to each of the photo-diodes. As with the first station 1, the second station 2 includes a laser diode (LD) assembly 15 including a plurality of laser diodes and a multiplexer 14 for multiplexing optical signals generated from the laser diodes. The second station 2 further includes a photo-diode (PD) assembly 13 including a plurality of photo-diodes and a de-multiplexer 12 for de-multiplexing optical signals transmitted over an optical fiber channel C1 to each of the photo-diodes. Although it is illustrated that the number of stations are two: the first and second stations 1 and 2, this is only an example, thus the number stations can be more than two.

However, it shall be noted that the above-mentioned optical transmission system described with reference to FIG. 1 requires at least two optical fiber channels corresponding to downlink and uplink channels, respectively, which thus results in difficulty in installing transmission lines or costly.

Thus, for an efficient utilization of optical fibers, a bi-directional transmission system that allows to transmit/receive the downlink and the uplink signals over a single optical fiber is needed.

FIG. 2 depicts a configuration of an example bi-directional optical transmission system according to an exemplary embodiment of the present invention. FIG. 2 exemplary depicts two stations, each of which includes a bi-directional optical transceiver module 20 or 21. Although it is illustrated that the number of stations are two: the first and second stations 1 and 2, this is only an example, thus the number of stations can be more than two. By way of example, the optical transceiver module 20 may include a laser diode 201 and a photo-diode 202, and the optical transceiver module 21 may include a laser diode 211 and a photo-diode 212. The laser diode 201 may generate and transmit an optical signal with a wavelength $\lambda 0$ over an optical fiber and the photo-diode 211 may receive the optical signal with the wavelength $\lambda 0$. Similarly, the laser diode 212 may generate and transmit an optical signal with a wavelength $\lambda 0'$ over the optical fiber and the photo-diode 202 may receive the optical signal with the wavelength $\lambda 0'$. Here, the wavelength $\lambda 0'$ is different from the wavelength $\lambda 0$.

FIG. 3 depicts a configuration of a bi-directional optical transmission system using existing bi-directional modules.

Referring to FIG. 3, the bi-directional optical transmission system may include two optical transceivers 30 and 40 which communicate with each other over a single optical channel 50. The optical transceiver 30 may include: a first laser diode 31 generating an optical signal of a downlink wavelength, a first photo-diode 32 for receiving an optical signal of an uplink wavelength which has been generated by the optical transceiver 40 and transmitted over the optical fiber channel 50, a beam splitter 34 for dividing the optical signal of the downlink wavelength and the optical signal of the uplink wavelength, a first optical filter 33 for passing the optical signal of the uplink wavelength, and an optical connector 35 for connecting the optical fiber channel 50 to the optical transceiver 30.

Similarly, the optical transceiver 40 includes: a second laser diode 41 generating the optical signal of the uplink wavelength, a second photo-diode 42 for receiving the optical signal of the downlink wavelength, a beam splitter 44 for dividing the optical signal of the downlink wavelength and the optical signal of the uplink wavelength, a second optical filter 43 that passing the optical signal of the downlink wavelength and reflecting the optical signal of the uplink wavelength, and an optical connector 45 for connecting the optical fiber channel 50 to the optical transceiver 40. It is understood that lines and arrows depicted in FIG. 3 are respectively optical paths and directions in which optical signals travel.

The above-mentioned optical transceivers 30 and 40 described with reference to FIG. 3 need to use the beam splitters 34 and 44. Given that an optical power loss at each beam splitter is about 4 dB, there may be a power loss of 8 dB through the two beam splitters 34 and 44. For example, in case of an optical transmission system with about 1 Gbps data rate, such power loss (e.g., 8 dB) might not be an issue, however if the date rate increases up to, e.g., 10 Gbps or more, the power loss of 8 dB may significantly affect an overall system performance. Thus, there is a need to develop a bi-directional optical transceiver with a relatively low power loss.

SUMMARY

In an aspect of the present invention, an optical transceiver is provided. The optical transceiver includes an optical transmitter and an optical receiver for performing a bi-directional communication over a single optical transmission fiber. The optical transmitter includes a laser diode, a main body in which a receptacle part corresponding to an optical connector is formed, the optical connector to which a first optical fiber is coupled using a first supporting member, a second supporting member for supporting a portion coupled between the receptacle part and the optical connector, a plane-spring part provided in at least one of the main body and the optical connector. When the optical connector has been coupled to the receptacle part, the plane-spring part is configured to provide an elasticity in a first direction to prevent an additional coupling toward the main body. The first direction is opposite toward the main body. The first optical fiber is connected to the optical receiver.

In another aspect of the present invention, an optical transceiver is provided. The optical transceiver includes an optical transmitter and an optical receiver for performing a bi-directional communication over a single optical transmission fiber. The optical receiver includes a first optical fiber over which a first optical signal generated by the optical transmitter is received and a second optical fiber coupled to the optical transmission fiber over which the bi-directional communication with at least one other optical transceiver is made. The optical receiver further includes a molding part for fixing the first and second optical fibers to the optical receiver, a dual optical fiber supporting part including holes through which the first and second optical fibers are supported and guided, a grin lens coupled to the dual optical fiber supporting part using a face contact or a space contact, an optical filter for reflecting the first optical signal generated by the optical transmitter and passing a second optical signal generated by an optical transmitter in the at least one other optical transceiver, an optical lens for arranging the second optical signal passing through the optical filter, and a photo-diode for receiving the second optical signal passing through the optical lens. The reflected first optical signal is focused and coupled to the second optical fiber through the grin lens, and transmitted to the at least one other optical transceiver over the optical fiber channel.

In another aspect of the present invention, an optical transceiver is provided. The optical transceiver includes an optical transmitter and an optical receiver for performing a bi-directional communication over a single optical transmission fiber. The optical transmitter includes a laser diode, a main body in which a receptacle part corresponding to an optical connector is formed, the optical connector to which a first optical fiber is coupled using a first supporting member, a second supporting member for supporting a portion coupled between the receptacle part and the optical connector, a plane-spring part provided in at least one of the main body and the optical connector, wherein when the optical connector has been coupled to the receptacle part. The plane-spring part is configured to provide an elasticity in a first direction to prevent an additional coupling toward the main body, the first direction is opposite toward the main body. The first optical fiber is connected to the optical receiver. The optical receiver includes a portion of the first optical fiber over which the first optical signal generated by the optical transmitter is received and a second optical fiber coupled to the optical transmission fiber over which the bi-directional communication with at least one other optical transceiver is made. The optical receiver further includes a molding part for fixing the first and second optical fibers to the optical receiver, a dual optical fiber supporting part including holes through which the first and second optical fibers are supported and guided, a grin lens coupled to the dual optical fiber supporting part using a face contact or a space contact, an optical filter for reflecting the first optical signal generated by the optical transmitter and passing a second optical signal generated by an optical transmitter in the at least one other optical transceiver, an optical lens for arranging the second optical signal passing through the optical filter, and a photo-diode for receiving the second optical signal passing through the optical lens. The reflected first optical signal is focused and coupled to the second optical fiber through the grin lens, and transmitted to the at least one other optical transceiver over the optical fiber channel.

In one embodiment of the present invention, the first optical fiber is a fiber having a bending loss lower than a reference value.

In one embodiment of the present invention, the optical filter is provided to be titled with respect to one face of the grin lens.

DETAILED DESCRIPTION OF THE EMBODIMENTS

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "Including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 4A:
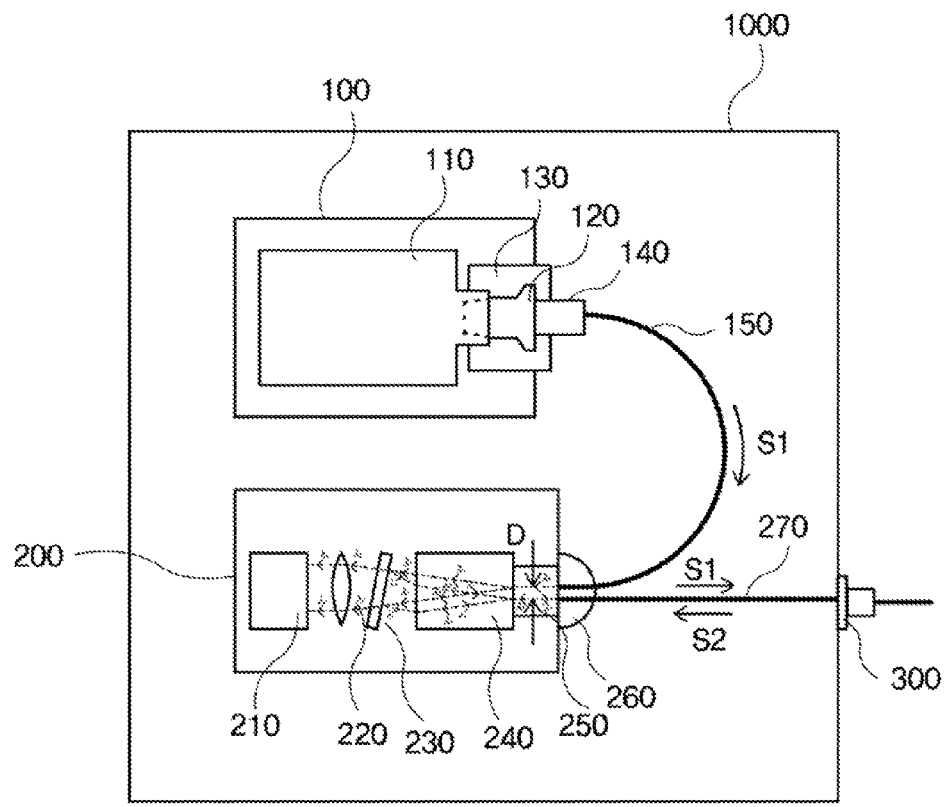
FIG. 4A is a block diagram of an example bi-directional optical transceiver according to an exemplary embodiment of the present invention.
Figure 4B:
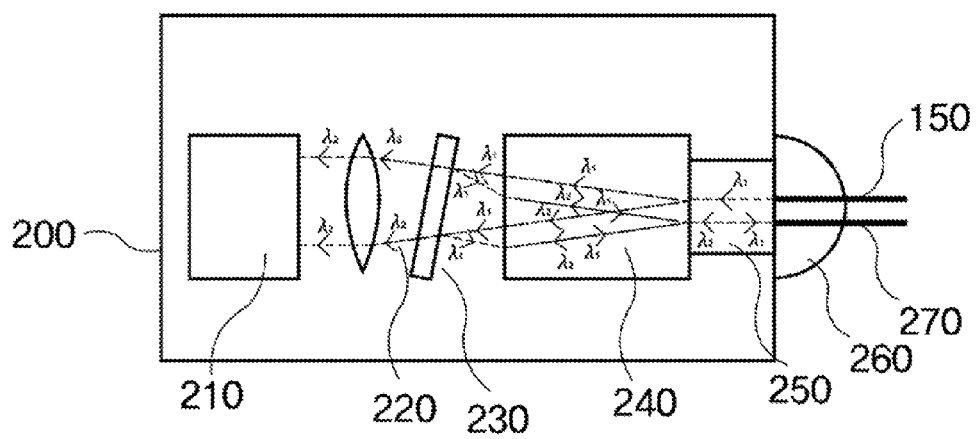
FIG. 4B is a block diagram of an optical receiver of the bi-directional optical transceiver of FIG. 4A according to an exemplary embodiment of the present invention.

FIG. 4A is a block diagram of an example bi-directional optical transceiver 1000 according to an exemplary embodiment of the present invention. FIG. 4B is a block diagram of an optical receiver 200 of the bi-directional optical transceiver 1000 of FIG. 4A according to an exemplary embodiment of the present invention.

Referring to FIG. 4A, the bi-directional optical transceiver 1000 may include an optical transmitter 100 and an optical receiver 200.

The optical transmitter 100 may include a transmission main body 110 where a receptacle part is formed at one end thereof to be connected with an optical transmission connector 120. The transmission main body 110 may include, but are not limited to: a laser diode (not shown), a driver (not shown) for driving the laser diode, and an optical lens (not shown) for coupling an output of the laser diode to an optical fiber 150.

The laser diode of the optical transmitter 100 may generate an optical signal with a downlink wavelength λ1 when the bi-directional optical transceiver 1000 works for a downlink optical transmission. In some embodiments, the above downlink wavelength λ1 may vary according to communication standards for which the optical transceiver 1000 is designed. Further, the downlink wavelength λ1 may be a predetermined wavelength or an arbitrary one within a predetermined wavelength band.

In some embodiments, a driver for driving the laser diode, data signal lines connected to the driver, power sources, etc. may be implemented separately.

The optical connector 120 may be connected to the receptacle part (not shown). Typically, an optical fiber may be directly coupled to the optical transmitter 100, but the optical fiber may be connected to the optical transmitter 100 through the optical connector 120 for eases of manufacturing processes such as replacing parts, eases of yield improvement, etc. The optical fiber may be connected to the optical connector 120 using a supporting member 140. The coupled optical connector 120 may be fastened (or fixed) to a supporting element 130 using a molding member such as epoxy, silicon, etc., or the like.

In case where an optical transceiver becomes smaller as is with SFP type, a size of the optical connector 120 becomes smaller accordingly, and when coupled, it is challenging to ensure whether a coupling is well made. Also, even after the coupling has been done, if an additional pressure is made on the coupled portion, the coupled portion may easily be damaged. Optical components may be relatively vulnerable to external pressure or shocks, unlike general electrical components. In the present invention, to address such problems, a plane-spring part (not shown) including a plane-spring may be provided in the transmission main body part 110 or the optical connector 120. The plane-spring part may be configured to provide an elasticity in an opposite direction to prevent further couplings from occurring or to a feedback indicating that the coupling has been made well.

Figure 5:
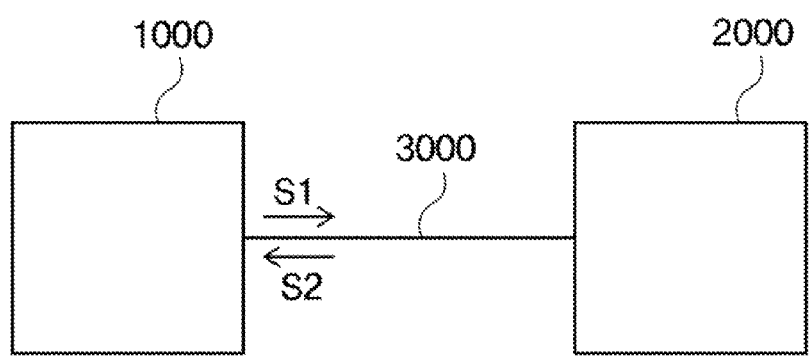
FIG. 5 is a block diagram of an example optical transmission system using bi-directional optical transceivers according to an exemplary embodiment of the present invention.

A first optical fiber 150 may be connected to the optical connector 120 to couple an output of the optical transmitter 100. The output optical signal of the optical transmitter 100 may be input to the optical receiver 200 through the first optical fiber 150. It is understood that the output optical signal of the optical transmitter 100 is a signal that has to be received by another optical transceiver 2000 (FIG. 5).

In addition, the first optical fiber 150 and a second optical fiber 270 may be coupled to the optical receiver 200. The first and second optical fibers 150 and 270 may be supported and/or guided via one end of a dual optical fiber supporting member 250 where two holes (not shown) are formed, and fastened (or fixed) through a molding member 260, such as epoxy, silicon, etc.

Further, a grin lens 240 may be coupled to another end of the dual optical fiber supporting member 250 by a face contact or space contact. When two elements are coupled by a face contact, it is understood that the elements are coupled while contacting each other through a face. When two elements are coupled by a space contact, it is understood that the elements are coupled while leaving a gap between the elements.

Figure 1:
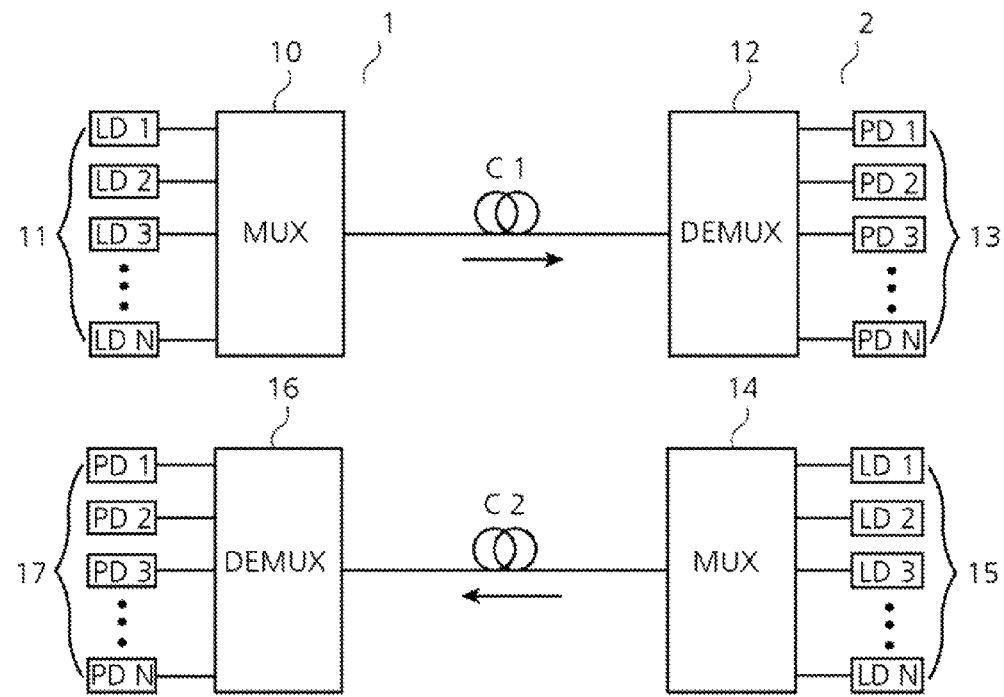
FIG. 1 is a block diagram of a WDM optical communication system.
Figure 2:
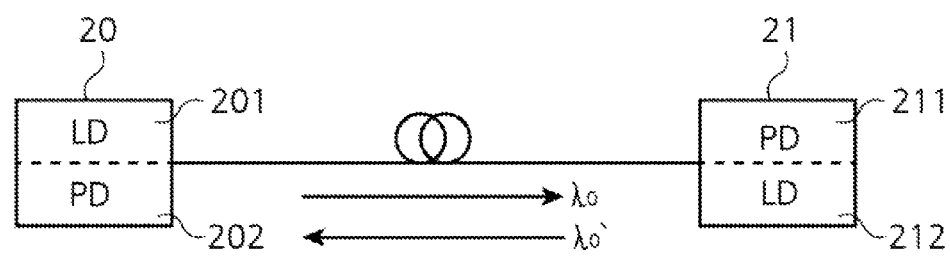
FIG. 2 is a conceptual block diagram of an optical communication system using bi-directional modules.
Figure 3:
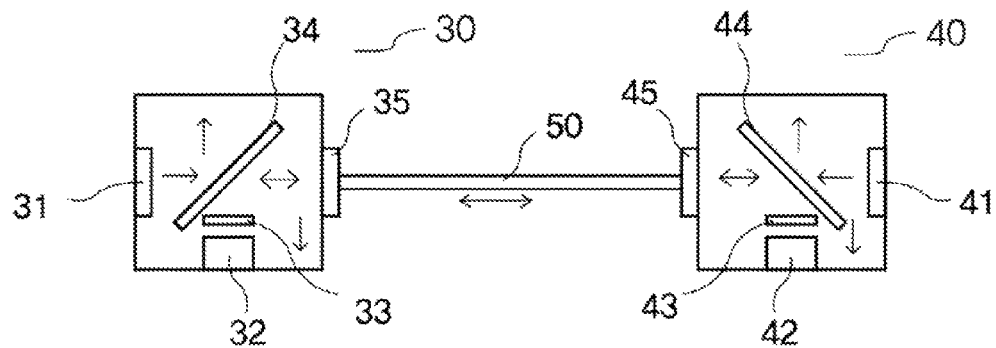
FIG. 3 is a block diagram of an example optical communication system using bi-directional modules.

An optical filter 230 may be provided at an opposite side to where the grin lens 240 is coupled to the dual optical fiber supporting member 250. The optical filter 230 may be configured to selectively pass an optical signal with certain wavelengths or reflect other optical signal with other wavelengths than the certain wavelengths. For example, the optical filter 230 reflects the output optical signal of the optical transmitter 100 with a downlink wavelength λ1 to transmit the same to an optical transceiver 2000 (FIG. 5) over a signal path including the second optical fiber 270, an external optical connector 300, and the optical fiber channel 3000. In addition, the optical filter 230 may be configured to pass an optical signal with an uplink wavelength λ2 which is generated from the optical transceiver 2000 and received over a signal path including the optical fiber channel 3000, the external optical connector 300, and the second optical fiber 270. For example, the optical filter 230 may pass the optical signal received through the second optical fiber 270. Although not shown in details, the optical transceiver 2000 may has substantially the same configuration as the optical transceiver 1000. Thus, duplicate description thereof will be omitted for the sake of simplicity. It should be noted that while each beam splitter used in the existing optical transceiver of FIG. 3 has an optical power loss of about 4 dB, the optical filter 230 used in the optical transceiver 1000 of FIG. 4 has an optical power loss of about 0.5 dB or less, thus reducing an optical power loss.

The optical signal with the uplink wavelength λ2 that has passed the optical filter 230 may be input to the photo-diode 210 through an optical lens 220. The optical receiver 200 may receive a signal. Although not shown in detail, a configuration for converting the optical signal to a corresponding electrical signal may be embodied using well known arts in the technical field to which the present invention is directed, and thus details thereof will be omitted for the sake of simplicity.

In addition, the optical signal with the downlink wavelength λ1 that has been received through the first optical fiber 150 may be reflected by the optical filter 230 to be input to the grin lens 240, and the grin lens 240 may be configured to focus the reflected optical signal S1 from the optical filter 230 to be incident to the second optical fiber 270. For example, in the grin lens 240, the optical signal S1 which has been reflected by the optical filter 230 and the optical signal S2 which has been received through the second optical fiber 270 may have substantially the same optical paths.

In order to make the optical signals S1 and S2 to have the same optical paths in the grin lens 240, the optical filter 230 may be controlled to be tilted with respect to one face of the grin lens 240 where the optical signals S1 and S2 are incident, or the one face of the grin lens may be tilted. Also, the optical filter 230 may be configured to reflect the optical signal S1 with a predetermined angle.

In some embodiments, the optical filter 230 may be embodied using a thin-film filter, a grating filter, etc.

In some embodiments, the second optical fiber 270 may be coupled to the optical fiber channel 3000 through an external optical connector 300.

The optical transceiver according to an exemplary embodiment of the present invention may be more compact such as SFP type, according to the recent trends. In some embodiments, to implement such compact optical transceiver, the fiber optical fiber 150 may be implemented using an optical fiber with a low bending loss (or a bending loss lower than a reference value (e.g., less than 1 dB), and/or a length of the grin lens 240 may need to be minimized.

To minimize the length of the grin lens 240, a difference in refractive index between a center portion of the grin lens 240 and an external portion thereof may be maximized. The length of the grin lens 240 is determined by equation 1. The refractive index of the center portion of the grin lens 240 (hereinafter, which will be referred to as a "center refractive index n0") may be, e.g., about 1.4 or more.

Also, to minimize (or reduce) the length of the grin lens 240, a focal length (f) with respect to a radius of the grin lens 240 may be maximized. For example, the focal length f may be, e.g., 0.4 or more. Thus, to implement the compact optical transceiver 1000 according to an exemplary embodiment of the present invention, it is preferable that a refractive index difference (e.g., a difference in refractive index between a center portion of the grin lens 240 and an external portion thereof) is large and the focal length f thereof is large. For example, the more the refractive index difference and the focal length f of the grin lens 240 are used, the more compact the optical transceiver 1000 is implemented.

The focal length f is determined by the following approximated equation 1: $f=1/(n(0)*g*\sin(g*l))$ Here, l is a length of a grin lens (e.g., 240 of FIG. 4A), g is a constant number, n(0) is a zero-order refractive index.

Thus, a distance (e.g., D of FIG. 4A) between two holes of the dual optical fiber supporting member 250 may be determined depending on characteristics of the grin lens 240 and optical paths of the above reflected optical signal S1. That is, the optical transceiver 1000 (or 2000) can be implemented using the above-mentioned elements and configuration thereof.

Referring to FIG. 5, another optical transceiver 2000 corresponding to (or communicating with the optical transceiver 1000) is needed for bi-directional communication, wavelengths of the respective output optical signals are different, and a wavelength which passes through the optical filter 230 may be determined according to the output optical signal that has been selected.

What is claimed is:

1. An optical transceiver including an optical transmitter and an optical receiver for performing a bi-directional communication over a single optical transmission fiber,
   wherein the optical transmitter comprises:
   a laser diode;
   a main body in which a receptacle part corresponding to an optical connector is formed;
   the optical connector to which a first optical fiber is coupled using a first supporting member;
   a second supporting member for supporting a portion coupled between the receptacle part and the optical connector;
   a plane-spring part provided in at least one of the main body and the optical connector, wherein when the optical connector has been coupled to the receptacle part, the plane-spring part is configured to provide an elasticity in a first direction to prevent an additional coupling toward the main body, the first direction is opposite toward the main body,
   wherein the first optical fiber is connected to the optical receiver.

2. An optical transceiver including an optical transmitter and an optical receiver for performing a bi-directional communication over a single optical transmission fiber,
   wherein the optical receiver comprises:
   a first optical fiber over which a first optical signal generated by the optical transmitter is received and a second optical fiber coupled to the optical transmission fiber over which the bi-directional communication with at least one other optical transceiver is made,
   a molding part for fixing the first and second optical fibers to the optical receiver;
   a dual optical fiber supporting part including holes through which the first and second optical fibers are supported and guided;
   a grin lens coupled to the dual optical fiber supporting part using a face contact or a space contact;
   an optical filter for reflecting the first optical signal generated by the optical transmitter and passing a second optical signal generated by an optical transmitter in the at least one other optical transceiver;
   an optical lens for arranging the second optical signal passing through the optical filter, and
   a photo-diode for receiving the second optical signal passing through the optical lens,
   wherein the reflected first optical signal is focused and coupled to the second optical fiber through the grin lens, and transmitted to the at least one other optical transceiver over the single optical transmission fiber.

3. An optical transceiver including an optical transmitter and an optical receiver for performing a bi-directional communication over a single optical transmission fiber,
   wherein the optical transmitter comprises:
   a laser diode;
   a main body in which a receptacle part corresponding to an optical connector is formed;
   the optical connector to which a first optical fiber is coupled using a first supporting member;
   a second supporting member for supporting a portion coupled between the receptacle part and the optical connector;
   a plane-spring part provided in at least one of the main body and the optical connector, wherein when the optical connector has been coupled to the receptacle part, the plane-spring part is configured to provide an elasticity in a first direction to prevent an additional coupling toward the main body, the first direction is opposite toward the main body,
   wherein the first optical fiber is connected to the optical receiver,
   wherein the optical receiver comprises:
   a portion of the first optical fiber over which the first optical signal generated by the optical transmitter is received and a second optical fiber coupled to the optical transmission fiber over which the bi-directional communication with at least one other optical transceiver is made,
   a molding part for fixing the first and second optical fibers to the optical receiver;
   a dual optical fiber supporting part including holes through which the first and second optical fibers are supported and guided;
   a grin lens coupled to the dual optical fiber supporting part using a face contact or a space contact;
   an optical filter for reflecting the first optical signal generated by the optical transmitter and passing a second optical signal generated by an optical transmitter in the at least one other optical transceiver;
   an optical lens for arranging the second optical signal passing through the optical filter; and a photo-diode for receiving the second optical signal passing through the optical lens, wherein the reflected first optical signal is focused and coupled to the second optical fiber through the grin lens, and transmitted to the at least one other optical transceiver over the single optical transmission fiber.

4. The optical transceiver of claim 1, wherein the first optical fiber is a fiber having a bending loss lower than a reference value.

5. The optical transceiver of claim 2, wherein the first optical fiber is a fiber having a bending loss lower than a reference value.

6. The optical transceiver of claim 3, wherein the first optical fiber is a fiber having a bending loss lower than a reference value.

7. The optical transceiver of claim 2, wherein the optical filter is provided to be titled with respect to one face of the grin lens.

\* \* \* \* \*